July 21, 1942.  C. L. BRACKETT  2,290,270
SELF-BINDING NUT
Filed Sept. 16, 1938  3 Sheets-Sheet 1
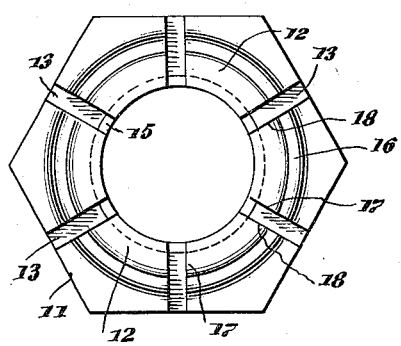
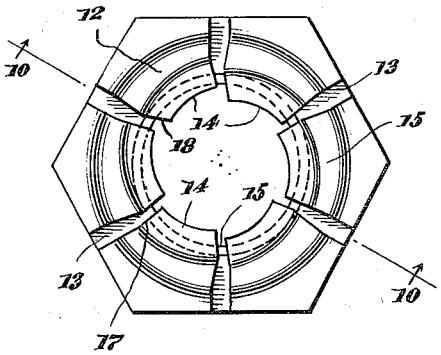
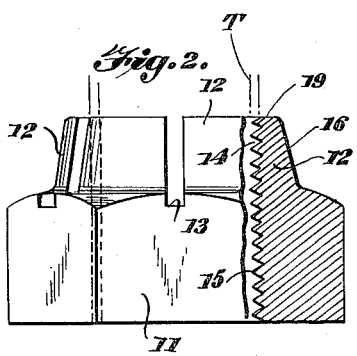
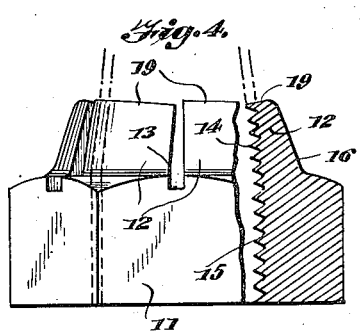
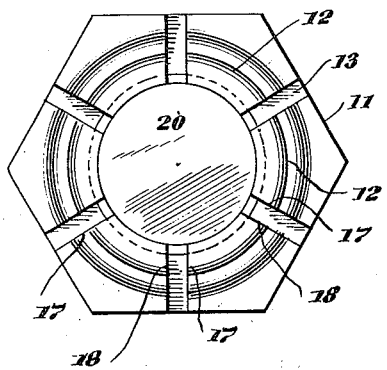
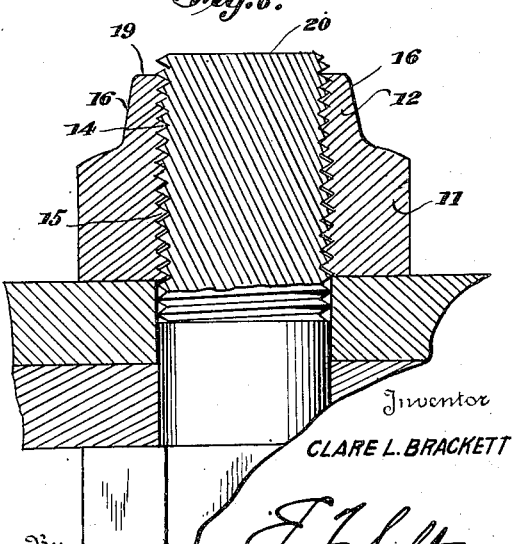
Inventor
CLARE L. BRACKETT July 21, 1942. C. L. BRACKETT 2,290,270
SELF-BINDING NUT
Filed Sept. 16, 1938 3 Sheets-Sheet 2
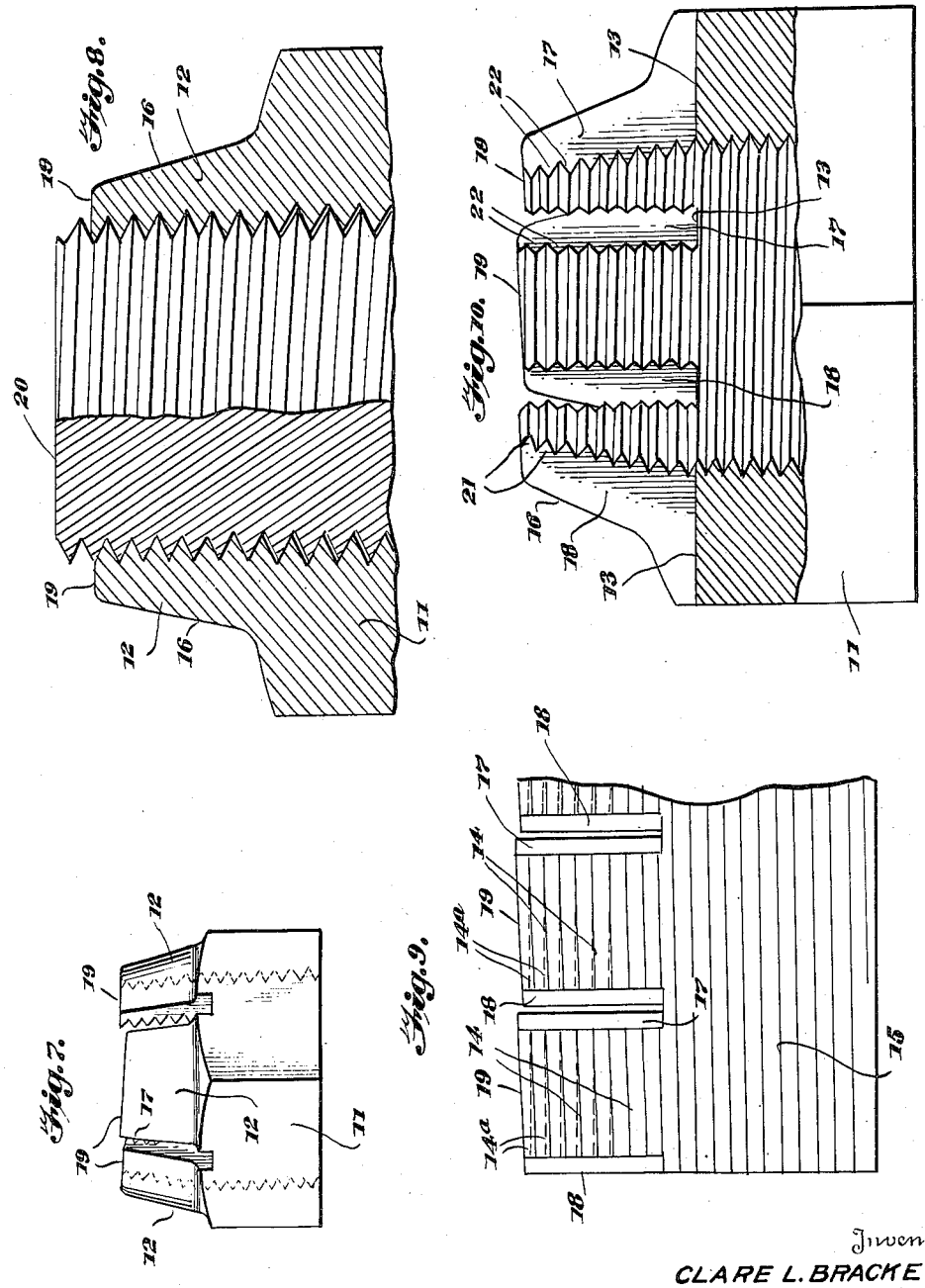
Inventor
CLARE L. BRACKETT July 21, 1942. C. L. BRACKETT 2,290,270
SELF-BINDING NUT
Filed Sept. 16, 1938 3 Sheets-Sheet 3
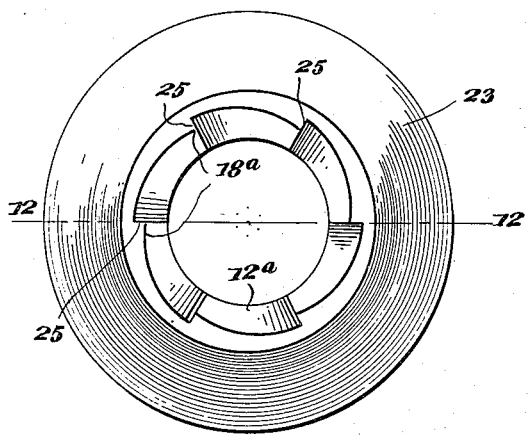
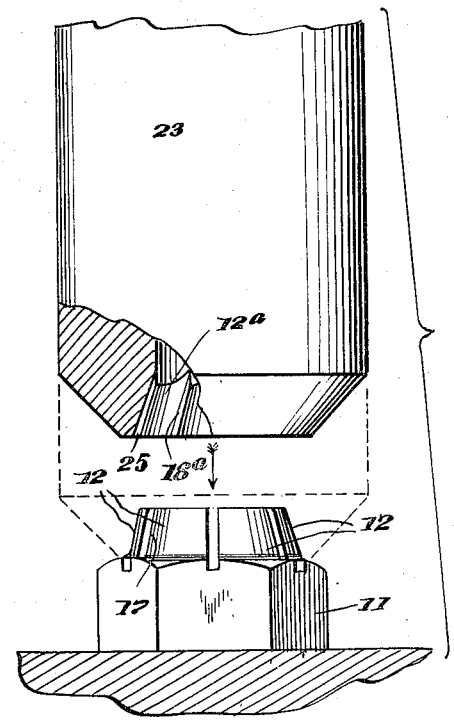
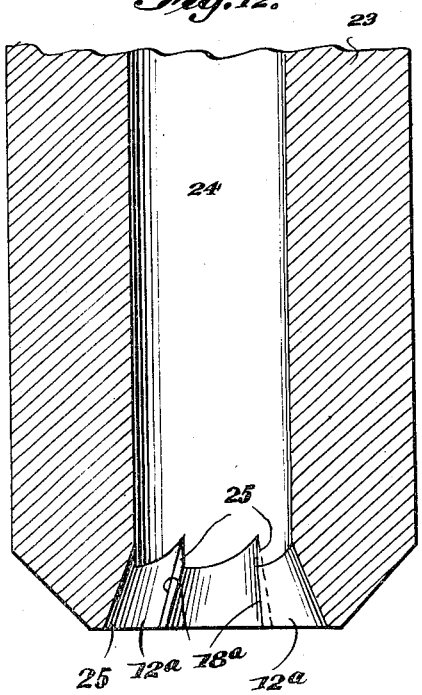
Inventor
CLARE L. BRACKETT
J. F. Salter
Attorney Patented July 21, 1942

2,290,270

UNITED STATES PATENT OFFICE 2,290,270

SELF-BINDING NUT

Clare L. Brackett, Detroit, Mich.

Application September 16, 1938, Serial No. 230,329

11 Claims. (Cl. 151—21)

This invention relates to the art of screw threaded fastening elements, and particularly to nuts.

The art has long known the so called "self locking" nut in which various types of detents are provided to insure a biting action against the threaded shank of an element with which the nut is engaged when retrograde movement of the nut occurs. Such devices, although efficacious, are only so for limited periods of service for their repeated reuse either damages the thread structure of the element with which they are engaged or the detents themselves become so dulled or blunted as to be worthless for their intended purposes.

Other expedients have been advanced from time to time, the chief variants of which are gripping fingers extending axially from the nut with a uniform inward radial bend part way across the nut bore so that they are forced apart by the entrant action of a bolt stem when the nut is threaded home, the resulting radial tension imparting a frictional grip. The fingers soon lose their grip and the thread structure is susceptible to damage by virtue of the distortion incident to application of the nut.

The present invention is designed to avoid the objectionable characteristics of prior art practice and at the same time to produce a nut which, when threaded home over a bolt stem or the like, effectively grips the bolt stem without biting thereinto, and with a combined radial and axial tension supplemented by an annular constricting tension, so that the nut binds itself firmly against relative retrogression of either the nut or the bolt stem.

It is also an object to provide a nut having integral gripping members so arranged that when the nut is threaded home over the shank of an associated threaded element the members grip the shank under tension in the constricting manner of the fingers of the human hand when they are closed against the palm.

Another object is to provide a nut having a plurality of axially extending gripping fingers tensioned by service application of the nut to impart torsional strains having their major force effective at the trailing edge portions of the fingers and at an angle convergent to the axis of the nut.

Still another object is to provide a nut of the character above stated which may repeatedly be used over an extended indefinite period without loss of efficiency and without damage to the thread structure of either the nut or the complemental threaded element with which it is associated in service.

Other objects will be readily apparent to those skilled in the art.

While the present disclosure constitutes an embodiment of the best means I have thus far devised for reducing the invention to practice, it is to be understood that the structural details may be varied as desired and may be substituted by substantial equivalents within the scope of the invention as claimed.

In the accompanying drawings, wherein like characters of reference designate like parts throughout the several views:—

Figure 1 is a top plan view of a nut made in accordance with the invention, prior to distortion of the gripping members.

Figure 2 is an elevation, partly in section, of the nut.

Figure 3 is a top plan view of the nut with the gripping members distorted in accordance with the invention.

Figure 4 is an elevation partly in section, of the nut as formed in accordance with Figure 3.

Figure 5 is a top plan view of the completed nut as applied over a bolt stem.

Figure 6 is an axial section through a nut and bolt as associated in service.

Figure 7 is an elevation similar to Figure 4 but from a different angle.

Figure 8 is an enlarged axial section, partly in elevation, of the top face portion of the nut engaged over a bolt stem.

Figure 9 is a fragmentary expanded plane elevation of the nut as viewed from its bore.

Figure 10 is an axial section taken on the line 10—10 of Figure 3.

Figure 11 is an end view of a forming tool by which the nut is deformed from its shape as shown in Figures 1 and 2 to that shown in Figures 3 and 4.

Figure 12 is an axial section taken on the line 12—12 of Figure 11.

Figure 13 is an elevation, partly in section, illustrating the manner of applying the forming tool, it being shown in dotted lines as fully applied over the nut fingers.

A nut made in accordance with my invention comprises a body 11, here shown as a hexagonal nut body, having the usual axial bore extending therethrough from its top to its bottom face and provided on its top face with an annular series of axially parallel spaced gripping members 12 integral with the nut body and surrounding the bore. A convenient manner of forming the gripping members is by providing a reduced axial extension on the top face of the nut as a frusto-conical portion having its periphery concentric with the nut axis, and then radially slotting the extension at a plurality of spaced points in an axial direction from the outer end of the extension into the top face portion of the nut body. As shown in Figures 1 and 2, the resulting structure disposes the gripping members 12 as an annular series of arcuate fingers spaced apart by radial slots 13. Preferably the slots lead from the center of each side face of the nut and are of appreciable width, although they may be otherwise arranged.

In producing the nut, the blank with its integral reduced frusto-conical axial extension is bored and slotted and the entire axial extent of the resulting bore is thread tapped. As best shown in Figure 2, this results in providing the fingers 12 with arcuate inner faces 14 threaded in continuation of the nut bore threads 15 and at the same helix angle; the curvature of the inner faces 14 of the fingers being in the radius of the nut bore.

The fingers are of equal length and curvature, their outer faces 16 being arcuately parallel to their inner faces and convergent with respect to the axis of the nut. Thus, each finger is of the same depth or thickness from its leading edge 17 to its trailing edge 18 at any point between its base and its top edge 19 in a plane passed transversely therethrough perpendicular to its inner face.

Following the initial formation of the nut as shown in Figures 1 and 2, in which the thread line T parallels the nut axis throughout the nut bore and the entire longitudinal extent of the inner face of each finger 12, the fingers are distorted into the positions shown in Figure 3. This is accomplished by bending the fingers radially inward in convergent relation to the axis of the nut, with, however, a greater degree of bend at their trailing edges than at their leading edges.

As shown in Figures 4 and 10 this bending operation disposes the inner threaded faces 14 of the fingers at an incline upwardly and inwardly convergent to the axis of the nut from their bases to their top edges 19. The degree of inward bend is progressively increased from each leading edge 17 to each trailing edge 18, as a result of which the angle of inclination is progressively increased uniformly from the leading to the trailing edge. Accordingly the entire area of the inner face of each finger is brought inside the thread circle of the nut bore and with the trailing top edge at a lesser radial distance from the axis of the nut than the leading top edge, both edges, however, lying within the thread circle.

Due to the fact that the arcs of the inner faces of the fingers are in the radius of the nut bore, the faces 14 will be eccentric to the bore at all points above their bases, and increasingly eccentric from a point just above their base lines to their top edges.

Figures 9 and 10 illustrate that as a result of the progressively increased inward radial bend the threads of the inner faces 14 of the fingers become progressively convergent with respect to the bore threads 15. The dotted lines 14a in Figure 9 illustrate the position of the threads on the faces 14 prior to the bending of the fingers. The rate of progression is uniform from the leading edge of each finger to its trailing edge. Further as a result of such bending of the fingers, their top edges 19 are given an inward and downward slope so that the trailing end of each top edge is lower than and radially inward of the leading end of the top edge of the next adjacent finger.

The relative offsetting of the threads thus effected between the adjacent edges of the fingers is an important feature of the invention as it provides for a clamping tension of the finger threads on the side faces of the mating threads of a bolt stem when the nut is applied, which clamping tension is exerted in a line parallel to the axis of the nut.

With particular reference to Figures 3, 5, 6 and 8, it will be seen that when the nut is threaded over a bolt stem 20 the fingers 12 will be expanded apart by the entrant action of the bolt stem as the nut is threaded home. The fingers have inherent resiliency and are by virtue thereof placed under tension which is compounded of a plurality of components, so that they grip the bolt stem with a firm frictional binding engagement.

As the fingers are forced apart they are moved outward radially so that they engage the bolt stem threads with a combined radial and axial tension progressively increased from their bases to their top edges. This insures full thread contact over the upper portions of the fingers, as shown best in Figure 8. At the same time the trailing edge portions 18 of the fingers are forced axially upward imparting a direct axial tension thereto of a greater degree than the axial tension imparted at their leading edge portions.

The side walls of the slots 13 are parallel and at their intersections with the finger threads provide shoulders 21 at their trailing ends. The greatest degree of all tensions exists at these shoulders which not only bear heavily against the bottoms of the mating thread grooves of the bolt stem, but also against the thread faces; the under inclined edges of the shoulders clamping down tightly against the upper inclined faces of the mating bolt stem threads. In like manner the slot walls intersect the finger threads at their leading ends to provide shoulders 22.

By reason of the fact that the finger threads are offset at the relative leading and trailing edges of adjacent fingers, the shoulders 21 and 22 are correspondingly offset or staggered relative to each other whereby, when the nut is threaded on a bolt stem, each mating thread of the stem is clamped between the under inclined edge of its corresponding nut thread shoulder 21 and the upper inclined edge of the immediately subjacent shoulder 22. This action results in a clamping grip applied by the finger threads to the bolt stem threads between their ridges and bottoms in a direction parallel to the axis of the nut, and supplements the previously described radial and axial tensions.

In the bending of the fingers they are, in effect, twisted circumferentially. In consequence of the major pressure existing at the shoulders 21 on the trailing edges of the fingers when the nut is applied a torsional strain is set up in each finger under a tension tending to rock the entire finger inwardly on a longitudinal axis at its leading edge. The effect of this tension is to cause each finger to constrict from its leading to its trailing edge on the bolt stem, somewhat in the constricting manner of the fingers of the human hand when they are closed against the palm. This is a further tension supplementing the tensions previously described.

Figure 4 illustrates that when the fingers are distorted both their inner and outer faces 14 and 16 are convergent with respect to the nut axis but at different angles. The diminishing thickness of metal in the fingers progressing from their bases to their top edges progressively increases their resiliency towards their outer ends, so that each finger has its major resiliency over the area of the major applied tension.

The displacement of the threads on the inner faces of the fingers, as best shown in Figure 9, with respect to the threads 15 of the nut bore, sets up an axial tension on the threads when the nut is applied and gives the proven locking effect of a staggered helix.

The distortion of the nut fingers is preferably accomplished by pressure application thereover of a forming tool having a plurality of pressure faces corresponding in number, angle and shape with the gripping fingers when in their deformed shape. As best illustrated in Figures 11-13, the tool comprises a cylindrical punch 23 having an axial socket or bore 24 in its work engaging end opening to an inwardly tapered countersunk recess formed in the work engaging end of the punch.

The annular wall of the recess is formed with a plurality of arcuate faces 12a corresponding in number and location to the nut fingers 12 and curved in the radius of the outer faces 16 thereof. These faces 12a are eccentric with respect to the punch bore 24, and decreasingly so from their outer to their inner ends axially of the punch, with their inner ends merging into the bore 24. Each face is inclined upwardly and inwardly from its outer end in convergent relation to the punch axis and the angle of inclination is progressively increased from one side edge to the other, resulting in an annular series of shoulders 18a having edge faces 25 extending radially and at diametrically opposed points; the opposed pairs of such edge faces lying at all points in a common diametrical plane extending axially of the punch.

The faces 12a are of equal angle, shape, curvature and area, and the corner edges of the shoulders 18a are at all points from their outer to their inner ends at a lesser radial distance from the axis of the punch bore 24 than are corresponding points along the other side edges of the faces, and increasingly so from their inner to their outer ends.

As shown best in Figure 12, the shoulder faces 25 have their sides tapered upwardly and inwardly of the punch at slightly different angles so that they are convergent at a point substantially coincident with the periphery of the bore 24 at a diametrically opposite and inward point thereon. By virtue of this arrangement each shoulder face 25 is of an appreciable width from its outer to its inner end with, however, a slightly greater width at its outer end.

In the operation of deforming the nut fingers the punch is forced down axially over the nut fingers, as indicated in Figure 13, whereupon the fingers will be given their peculiar deformation, as previously described. It should here be pointed out that the angle of inclination of the punch faces 12a is greater than the angle of inclination of the outer faces of the nut fingers, and as the major inclination occurs at the shoulders 18a the nut fingers will be given a corresponding bend in forming their trailing edge portions 18.

An important feature of the tool 23 lies in the provision of the shoulder faces 25 which provide centering abutments entering the nut slots 13 when the tool is moved into pressure engagement with a nut and backing up the leading edges 17 of the nut fingers so that they cannot be twisted or be forced to move radially outward with respect to the thread circle of the nut. As the faces 25 provide radial plane surfaces against which the leading flat edges 17 of the nut fingers abut, and further, as no relative rotation takes place between the nut and tool in the forming operation, the leading edges of the nut fingers will remain in substantially radial planes and each finger will be, in effect, bent circumferentially on a longitudinal axis located at its leading edge.

While Figure 13 illustrates the forming tool as being moved axially into engagement over a nut fixed on a suitable support, it is evident that if found desirable the nut may be moved relative to the forming tool or to a die having the same formative facing. Either the work as represented by the nut or the tool as represented by the punch may be reciprocated axially with respect to the other.

Nuts constructed in accordance with this invention, when applied over and threaded home on bolt stems and the like, are effectively thread locked thereon with a firm self-binding action under resilient tension of a plurality of gripping members arranged in a manner to brake the nut against retrograde movement of either the nut or the stem to which it is applied.

I claim:

1. A nut comprising a body having a threaded axial bore therethrough, a plurality of gripping members integral therewith and extending axially from one face thereof, said members having longitudinal inner faces curved from their leading to their trailing edges in arcs of the same radius as the radius of the nut bore from end to end and threaded in continuation of the bore thread at the same helix angle, the outer face portions of said members being substantially concentric to the inner face portions, and both curved faces of each member being longitudinally convergent at different angles to the nut axis and also bent to be increasingly eccentric to the nut bore from their inner to their outer ends.

2. A nut having on its top face an annular series of spaced fingers integral therewith and extending axially therefrom, said fingers having substantially concentric inner and outer face portions, the inner face portions being threaded in continuation of the nut bore at the same helix angle and on the same radius therewith, and said fingers being inclined from their base portions radially inward of the nut bore at an angle of inclination progressively increased from their leading to their trailing edges.

3. A nut having on its top face an annular series of spaced fingers integral therewith and extending axially therefrom, said fingers having their inner faces curved from their leading to their trailing edges in arcs of the same radius as the radius of the nut bore and threaded in continuation thereof at the same helix angle, the outer face portions of said fingers being substantially concentric to the inner face portions and tapered upwardly and inwardly from their bases to their top edges, and said fingers being inclined from their base portions radially inward of the nut bore at an angle of inclination progressively increased from their leading to their trailing edges.

4. A nut having on its top face a series of arcuate fingers integral therewith and surrounding the nut bore in axially parallel spaced relation, the inner faces of the fingers being threaded in continuation of and at the helical angle of the nut bore threads, and said fingers being bent radially inward at an angle to the bore axis at both their leading and trailing edge portions and to a greater degree at their trailing edge portions than at their leading edge portions.

5. A nut having on its top face a series of fingers integral therewith and surrounding the nut bore in axially parallel spaced relation, the inner faces of said fingers being transversely curved from their leading to their trailing edges in arcs of the same radius as the radius of the nut bore and flush therewith at their base portions, said inner faces being threaded in continuation of the bore threads at the same helix angle, said fingers being of equal length and curvature, the outer face portions of said fingers being concentric to the inner face portions and the thickness of the fingers being the same from their leading to their trailing edges in any plane perpendicular to their inner faces, and said fingers being inclined radially inward of the nut bore above their bases at an angle of inclination progressively increased from their leading to their trailing edges.

6. A nut having on its top face an annular series of spaced fingers integral therewith and extending axially therefrom, said fingers having arcuate inner faces initially threaded in continuation of the nut bore at the same helix angle, the fingers being so bent that the threads thereon are relatively offset axially at the leading and trailing edges of adjacent fingers.

7. A nut having on its top face an integral coaxial frusto-conical extension with a bore extending entirely therethrough, said bore being threaded throughout at the same helix angle, said extension having a plurality of radial slots extending axially from the top face of the nut to the top edge of the extension, and the entire portions of said extension between the slots being twisted circumferentially and inclined inwardly convergent to the nut axis at an angle of inclination progressively increased from their leading to their trailing edges.

8. A nut having on its top face a series of fingers integral therewith and surrounding the nut bore in axially parallel spaced relation, the inner faces of said fingers being curved from their leading to their trailing edges in arcs of the same radius as the radius of the nut bore and threaded in continuation thereof at the same helix angle, the entire inner face of each finger above its base portion being disposed inwardly of the thread line of the bore at an angle convergent to its axis, and the trailing edge of the inner face on each finger being at a lesser radial distance from the nut axis than its leading edge.

9. A nut provided on one end thereof with a series of integral resilient gripping fingers threaded internally, said fingers being bent inwardly so that the thread portion of each finger at the trailing end is progressively increasing out of helical alignment with the true helix of the nut thread from the base of the fingers to the top thereof.

10. The method of forming a self-binding nut, which comprises providing one face of a nut with gripping fingers threaded in continuation of the nut bore and at the same helix angle therewith, and bending the fingers radially inward with a greater degree of bend at their trailing edges than at their leading edges.

11. The method of forming a self-binding nut, which comprises providing one face of a nut with gripping fingers threaded in continuation of the nut bore and at the same helix angle therewith, and bending the fingers radially inward in converging relation with a progressively increasing degree of bend from their leading to their trailing edges.

CLARE L. BRACKETT.